Aug. 4, 1964  J. W. FORREST  3,142,995
INCREMENTAL DIAL MECHANISM
Filed Feb. 2, 1962  2 Sheets-Sheet 1
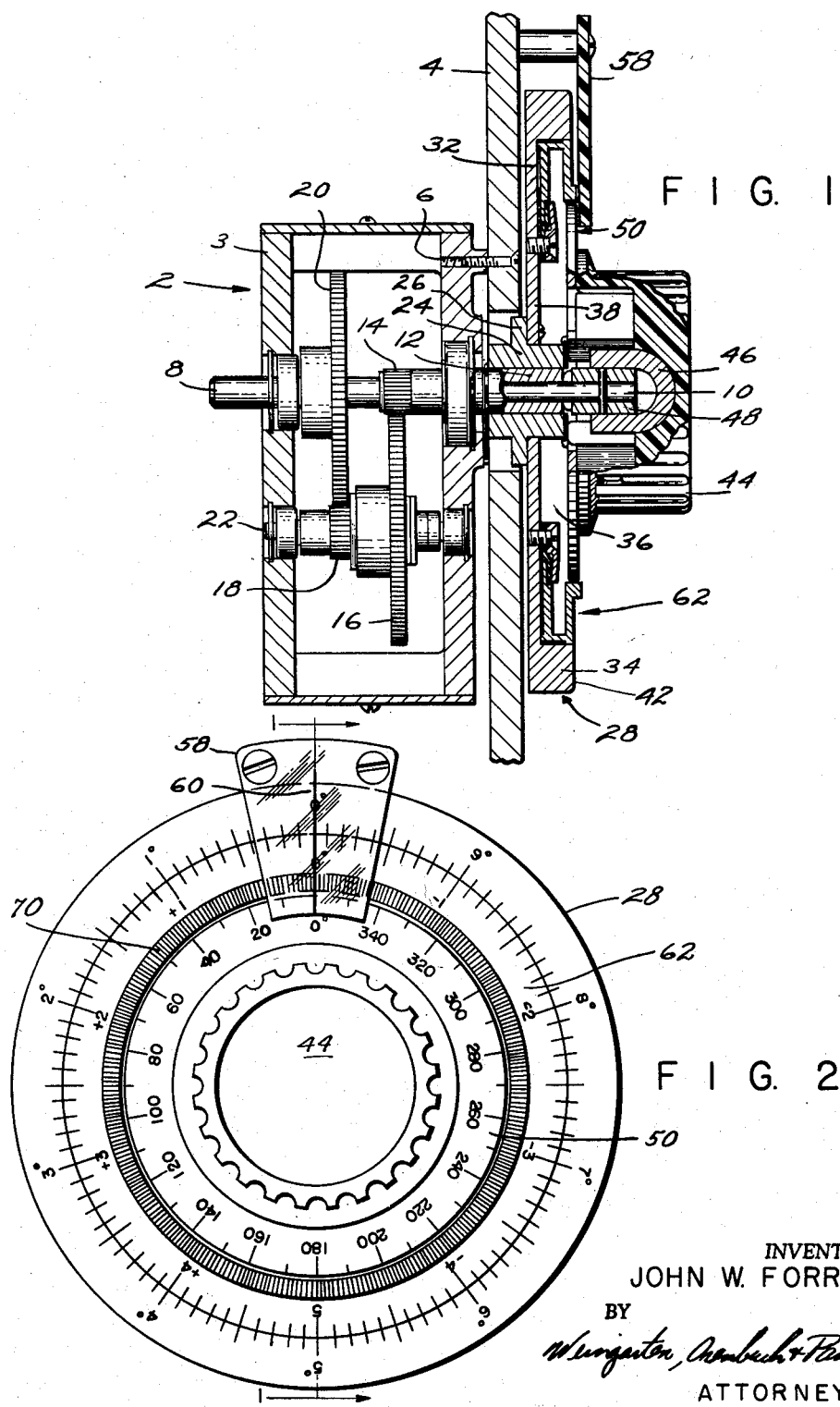
INVENTOR.
JOHN W. FORREST
BY
ATTORNEYS

INVENTOR.
JOHN W. FORREST
BY
ATTORNEYS

United States Patent Office 3,142,995
Patented Aug. 4, 1964

3,142,995
INCREMENTAL DIAL MECHANISM
John W. Forrest, West Acton, Mass., assignor to Acton Laboratories, Inc., Acton, Mass., a corporation of Massachusetts
Filed Feb. 2, 1962, Ser. No. 170,659
13 Claims. (Cl. 74—10.54)

This invention relates to position indicators and more particularly to an incremental dial mechanism for indicating the angular position of a rotatable member.

In many situations involving mechanical and electromechanical devices, it is essential to provide a precise readout of the angular position of a rotatable member such as a shaft or disc. By way of illustration but not limitation, some of the devices which involve rotatable components whose positions are required to be determined are precision shaft positioners, potentiometers, variable capacitors, synchros, resolvers, and direction indicators such as compasses. Often times it is sufficient to provide an indication of the position of the rotable component relative to an absolute reference point, e.g., zero degrees. However, in some cases it is necessary not only to determine the position of a rotable component relative to an absolute reference point, but also to indicate the position and direction of displacement of the same component relative to a previously measured position. While various indicating devices have been provided for the purpose of facilitating precise measurement of the position of a rotatable component relative to a fixed reference point, there has been lacking a reliable, easy-to-use position indicator which simultaneously could provide an indicator of the position of a rotatable component relative not only to an absolute reference point but also to a variable reference point where the variable reference point is a prior, measured position of the rotatable component.

Accordingly, the primary object of the present invention is to provide a dual speed drive having a dial mechanism which not only facilitates measurement of the position of a rotatable component relative to a fixed reference point, but also can provide an indication of the position and even the direction of displacement of the same component relative to a selected, variable reference point.

A further object of the present invention is to provide a dial mechanism capable of indicating small incremental angles of displacement of a rotatable member relative to a selected reference point while simultaneously providing an indication of the angle of displacement of the same member relative to a fixed reference point.

A more specific object of the present invention is to provide an incremental dial mechanism which is simple and easy to construct and which is adaptable for use with various well-known mechanical and electromechanical units having rotatable elements whose positions must be readily and accurately determinable by visual observation. Essentially, the dial mechanism comprises first and second incremental dials, one of which is rotatable relative to the other, means for normally maintaining fixed the angular position of the second dial relative to the first dial, means establishing a fixed reference point in connection with which the dials are read, and means for rotating the first dial in synchronism with a rotatable element whose angular position and/or displacement is to be determined, whereby when said dials are stopped each will provide separate readings which differ from each other by an amount equal to the angular displacement of the second dial relative to the first dial.

Other objects and many of the attendant advantages of the present invention will become more readily apparent from the following detailed specification when considered together with the accompanying drawings wherein:

FIG. 1 is a side view of apparatus embodying an incremental dial mechanism constructed according to the present invention, the incremental dial mechanism being shown in section with the section taken along line 1—1 of FIG. 2;

FIG. 2 is a front view of an incremental dial mechanism constructed according to the present invention;

Figure 3:
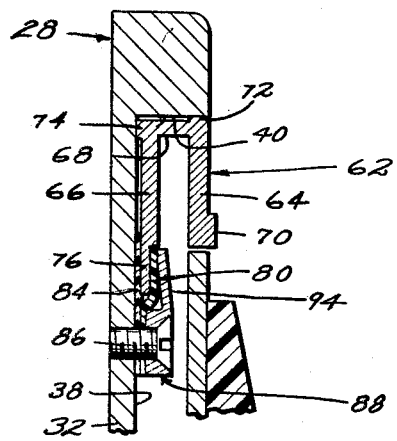
FIG. 3 is an enlargement of a portion of the incremental dial mechanism shown in FIG. 1.

Referring now to FIGS. 1 and 2, the invention is illustrated in a preferred application—a duel speed dial indicator. In FIG. 1, the illustrated apparatus embodies a conventional dual speed drive unit identified generally at 2 which has a housing 3 which may be mounted in various ways, preferably by attachment to a supporting chassis member such as a panel 4 by fasteners such as screws 6. The dual speed drive 2 has an output shaft 8 and dual input shafts 10 and 12. The inner shaft 10 is adapted to drive the output shaft 8 at a different speed ratio than the outer shaft 12. In the illustrated embodiment, shaft 10 is directly connected to output shaft 8, giving a velocity ratio of unity. The outer shaft 12 works through a reverted gear train comprising gears 14, 16, 18, and 20 to give a velocity ratio of 36:1, or 10 degrees ratation of output shaft 8 or inner shaft 10 for each complete revolution of shaft 12. In other words, if the inner shaft 10 is turned 10°, the outer shaft 12 will turn 360°. Gears 14 and 20 are on shafts 12 and 8 respectively while gears 16 and 18 are mounted on a separate shaft 22. Releasably secured to shaft 12 by a set screw (not shown) is a bushing 24 having a flange 26 to which is removably secured an outer dial member designated generally by the numeral 28. The outer dial member has a circular configuration and comprises a relatively thin body portion 32 and a relatively thick peripheral portion 34. The difference in thicknesses between the body portion 32 and the peripheral portion 34 results in an annular depression 36 defined by the front face 38 of body portion 32 and the inner edge 40 of the peripheral portion 34. Although not shown, it is to be noted that the outer edge of dial 28 is knurled so as to facilitate manual movement thereof. The front face 42 of outer dial 28 is provided with 100 graduations which are subdivided into groups of ten. Associated with these ten groups are the numeric designations ranging from 0° to 9°.

The inner shaft 10 carries a knob 44. The latter has a fixed metal insert 46 which fits on a bushing 48 on shaft 10. Although not shown, it is to be appreciated that the knob has a radial set screw which locks it to bushing 48. The inner face of the knob 44 carries an annular inner dial member identified generally at 50. The inner dial member is attached to the inner face of the knob by screws (not shown) which pass through holes in the inner dial 50 and are received in tapped holes in the knob 44. The inner dial 50 carries a series of graduations subdividing its circumference into thirty-six equal sections. Alternate graduations are accompanied by numeric designations extending from 0° to 340°.

To the extent already described, the illustrated device is capable of indicating with precision the angular displacement of output shaft 8 from a fixed reference point. The fixed reference point is established by a suitable element, as, for example, a transparent plate 58 attached to the panel 4 which is provided with an engraved line 60 to indicate the fixed reference position. The shaft 8 may be rotated by manipulating either the knob 44 or the outer dial 28. For fast turning through relatively large angles, the operator will use knob 44 and scan inner dial 50 which is graduated in ten-degree increments.

Pursuant to the present invention, to the conventional construction just described there is added an auxiliary dial which makes it possible to determine small angular increments through which the shaft 8 is rotated relative to a reference point which is something other than the fixed reference point established by reference line 60. The auxiliary or incremental dial is in the form of an annulus of U-shaped cross section and is designated generally at 62.

As seen best in FIG. 3, the incremental dial 62 fits within the annular recess 36 of outer dial 28 and comprises annular front and rear portions 64 and 66 which are formed integral with a connecting peripheral portion 68 adjacent their outer edges. The front portion 64 has a raised knurled surface 70 and also a series of graduations identical to the ones on dial 28. However, they are divided into two equal groups, one group designated as "plus" degrees and the other as "minus" degrees. The peripheral surface of dial 62 has a relatively narrow flange 72 which lightly engages the inner surface 40 of the outer dial 28 while the rear surface of the same dial has a relatively narrow flange 74 which lightly engages the inner face 38 of outer dial 28. Engagement of flange 72 with the inner surface 40 helps to prevent lateral shifting of the incremental dial, thereby keeping it concentric with the shafts 10 and 12. Flange 74 serves to space the rear portion 66 of dial 62 from the inner face 38. The inner diameter of the rear portion 66 is substantially smaller than the inner diameter of the adjacent front portion 64. Moreover, the inner edge of the rear portion 66 is reduced in thickness as shown at 76.

The relatively thin inner edge 76 is sandwiched between two identical annular discs 80 and 84 which are made of a strong but flexible material having a relatively low coefficient of friction. Preferably, these discs are formed of nylon or a multi-fluoroethylene plastic such as Teflon. However, the discs may also be formed of other plastic or metal materials which are not only resilient and strong but also have a relatively low coefficient of friction. The two discs 80 and 84 are provided with a series of holes adjacent their inner edges in order to accommodate a plurality of screws 86 which screw into the outer dial 28. The screws also pass through and support a spring clamp identified generally at 88. Spring clamp 88 is made of a resilient metal, preferably machine brass.

Figure 4:
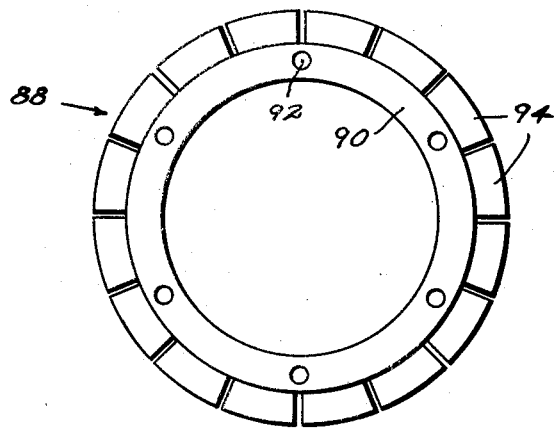
FIG. 4 is a front view of an annular spring clamp which forms part of the incremental dial mechanism.

As seen best in FIG. 4, spring clamp 88 is of annular construction and has a relatively thick inner portion 90 which is provided with a series of holes 92 to accommodate the screws 86. It is to be observed that holes 92 are countersunk so that the heads of screws 86 will be flush with the surface of the spring clamp 88, as shown in FIG. 3. The outer portion of spring clamp 88 is of reduced thickness and is subdivided into equally spaced radial fingers 94. In practice, the thickness of the outer portion of the spring clamp 88 is about one-third the thickness of the inner portion 90 and, as seen in FIG. 3, is located to one side of the profile center line of the inner portion. The spacing between the fingers 94 is relatively narrow, so that very little of the peripheral portion of the spring clamp is omitted.

The spring clamp is positioned against the two nylon rings, with the spring fingers 94 engaging the ring 80 near its outer edge. The screws 86 are turned in sufficiently far so as to cause the underside of the thick portion of the clamp ring 88 to clamp together the inner peripheral portions of the two rings 80 and 84. As a consequence, the forward ring 80 bears against the incremental dial, forcing the latter against the rear ring 84. With this arrangement, incremental dial 62 is restrained from rotating freely relative to the outer dial 28. However, due to the low coefficient of friction of rings 80 and 84, the incremental dial may be rotated relative to the outer dial with a small amount of manual pressure. In practice, this is achieved by restraining dial 28 (directly or through knob 44) with one hand and turning dial 62 with the other hand. Once the incremental dial is positioned at a desired location, the clamping force exerted on it by rings 80 and 84 will prevent it from rotating by itself relative to dial 28.

The advantages of the present invention will be apparent from the following explanation of its use based upon the assumption that the shaft 8 has a selected zero position and that at this position the outer and inner dials 28 and 50 will have their zeros in alignment with reference line 60. Let it be assumed also that dial 62 is aligned with dial 28 so that its zero also coincides with reference line 60. When shaft 8 is rotated away from its zero position by manipulation of the inner or outer dials, the zeros of the inner and outer dials will shift according to the extent by which the shaft 8 is rotated. The incremental dial will rotate the same amount as outer dial 28. At this point, dials 28 and 50 together will indicate the new position of shaft 8 relative to its zero position and dial 62 will indicate the magnitude and direction in which shaft 8 rotated if it rotated less than 5 degrees. If from this new position shaft 8 must be rotated to another position less than 5 degrees away, dial 62 may again provide a direct indication of the magnitude and direction of rotation of shaft 8, but from its previously measured position as a reference. To do this, it is necessary first to turn incremental dial 62 back to zero alignment with reference line 60 while holding dials 28 and 50 in their first measurement positions. Having so displaced and positioned the incremental dial, shaft 8 may then be rotated to its new position less than 5 degrees away. When this has been done, dials 28 and 50 will give a direct reading of the new positions and dial 52 will provide a direct indication of the magnitude and direction of the incremental change in position of the shaft, i.e., the difference between the two measured positions of shaft 8. Thus, if the first measured position of shaft 8 is 20° and the second measured position is 17°, the incremental dial will read minus 3°.

The illustrated incremental dial mechanism has many advantages, chief of which are its simplicity and relatively low cost. A further advantage is the ease with which it can be read, due primarily to the substantially coplanar relationship among the three dials. Still other advantages are its adaptability to existing dual speed drive mechanism and the convenience with which the incremental dial can be moved to a new position.

Obviously, many modifications and variations of the present invention are possible in the light of the above teachings. One important modification is attained by (1) changing the numeric designations on dial 62 so that it reads from 0° to 9° in the manner shown in FIG. 2 for outer dial 28 and (2) omitting all graduations from outer dial 28, whereby the mechanism will have only two graduated dials—inner dial 50 and the modified dial 62. This modified arrangement is especially good for zeroing synchros which are mechanically connected to output shaft 8. In the usual case, when a connected synchro is nulled electrically, the fine dial is displaced from zero by a few degrees. Precise zeroing of the dial mechanism without disturbance of the electrical setting is achieved by holding outer dial 28 and rotating dial 62 until it is aligned precisely at zero. Thereafter, dial 62 will function as a fine vernier to give together with dial 50 a direct indication of shaft position. Other modifications and variations also are possible. Therefore, it is to be understood that the invention is not limited in its application to the details of construction and arrangement of parts specifically described or illustrated, and that within the scope of the appended claims it may be practiced otherwise than as specifically described or illustrated.

What is claimed is:

1. A dial mechanism comprising first and second concentric dials rotatable in synchronism with each other and having cooperating scales for establishing and indicating instantaneously the angular position of a given rotatable member relative to a first fixed reference point, and a third concentric incremental dial operatively coupled to one of said first and second dials and having a scale thereon for indicating the angular displacement of the same rotatable member from a second selected reference point.

2. A dial mechanism as defined by claim 1 wherein said third dial is rotatable relative to said one dial, and further including slip-friction means for normally preventing relative rotation between said one dial and said third dial.

3. An incremental dial mechanism comprising a dual speed drive having coaxial first and second input shafts and an output shaft connected for rotation at a different speed ratio with each input shaft, a first dial attached to and rotatable with one of said input shafts, a second dial attached to and rotatable with the other of said input shafts, a third incremental dial coaxially connected to one of said first and second dials, said third dial normally movable with said one dial but rotatable relative to said one dial when subjected to a different torque, each of said dials having a circular scale thereon, and stationary means establishing a common reference point for all of said scales, whereby when said dials are rotated the scales thereon will indicate the angular displacement of said dials from said common reference point.

4. A dial mechanism as defined by claim 3 wherein the scale on said third dial is surrounded by the scale on said one dial and surrounds the scale on the other of said first and second dials.

5. A dial mechanism comprising a dual speed drive having first and second coaxial input shafts and an output shaft connected for rotation with both input shafts at different speed ratios, a first coarse dial attached to one of said input shafts, and a second fine dial connected to the other of said input shafts with a portion thereof surrounding and in coplanar relation with a portion of said first dial, said second fine dial connected to the other of said input shafts by a slip friction connection wherein the friction is sufficient to cause said second dial to rotate with said other shaft in the absence of a manual restraining force and insufficient to cause said second dial to rotate with said other shaft in the presence of a manual restraining force.

6. Apparatus for indicating the angular position of a rotatable member relative to both a fixed and a variable reference point comprising, a rotatable output shaft, a first rotatable input shaft connected to said output shaft whereby said output shaft will rotate at the same speed as said first input shaft, a second rotatable input shaft, two-way drive means connecting said second input shaft with said output shaft and said first input shaft whereby said output shaft and said first input shaft will rotate at a fraction of the speed of said second input shaft when said output shaft is driven by either of the input shafts, said second input shaft mounted in coaxial relation to said first input shaft, a first dial mounted for rotation with said first input shaft, said first dial having a circumferential series of graduations designated in angular degrees, a second dial mounted for rotation with said second input shaft, said second dial also having a circumferential series of graduations designated in angular degrees, means establishing a fixed reference point for said first and second dials, said first and second dials together constituting a micrometer for indicating instantaneously the angular position of said output shaft relative to said fixed reference point, a third dial also having a circumferential series of graduations designated in angular degrees, said third dial disposed in coaxial relation with said second input shaft, and means providing a slip-friction connection between said second and third dials with the friction sufficient to cause said third dial to rotate with said second dial in the absence of a manual restraining force on said third dial but insufficient to prevent said third dial from being rotated manually relative to said second dial, whereby said third dial may be used to inidcate the angular displacement of said output shaft from a selected variable reference point.

7. Apparatus for indicating the angular position of a rotatable member relative to both a fixed and a variable reference point comprising, a rotatable output shaft, a first rotatable input shaft connected to said output shaft whereby said output shaft will rotate at the same speed as said first input shaft, a second rotatable input shaft, two-way drive means connecting said second input shaft and said output shaft whereby said output shaft will rotate at a fraction of the speed of said second input shaft when said output shaft is driven by either of said input shafts, said second input shaft mounted in coaxial relation to said first input shaft, a first dial mounted for rotation with said first input shaft, said first dial having a circumferential series of graduations designated in angular degrees, a second dial mounted for rotation with said second input shaft, said second dial also having a circumferential series of graduations designated in angular degrees, means establishing a fixed reference point for said first and second dials, said first and second dials together constituting a micrometer for indicating instantaneously the angular position of said output shaft relative to said fixed reference point, a third dial also having a circumferential series of graduations designated in angular degrees, said third dial disposed in coaxial relation with said second input shaft, said third dial surrounding said first dial and surrounded by said second dial, and means providing a slip-friction connection between said second and third dials with the friction sufficient to cause said third dial to rotate with said second dial in the absence of a manual restraining force on said third dial but insufficient to prevent said third dial from being rotated manually relative to said second dial, whereby said third dial may be used to indicate the angular displacement of said output shaft from a selected variable reference point.

8. Apparatus for indicating the angular position of a rotatable member relative to both a fixed and a variable reference point comprising, a rotatable output shaft, a first rotatable input shaft connected to said output shaft whereby said output shaft will rotate at the same speed as said first input shaft, a second rotatable input shaft, two-way drive means connecting said second input shaft and said output shaft whereby said output shaft will rotate at a fraction of the speed of said second input shaft when said output shaft is driven by either of said input shafts, said second input shaft mounted in coaxial relation to said first input shaft, a first dial mounted for rotation with said first input shaft, said first dial having a circumferential series of equal graduations designated in terms of angular degrees, a second dial mounted for rotation with said second input shaft, said second dial also having a circumferential series of equal graduations designated in terms of angular degrees, means establishing a fixed reference point for said first and second dials, said first and second dials together constituting a micrometer for indicating instantaneously the angular position of said output shaft relative to said fixed reference point, a third dial also having a circumferential series of equal graduations designated in terms of angular degrees, said third dial disposed in coaxial relation with said second input shaft in substantially coplanar relation with said second dial, and means providing a slip-friction connection between said second and third dials with the friction sufficient to cause said third dial to rotate with said second dial in the absence of a manual restraining force on said third dial but insufficient to prevent said third dial from being rotated manually relative to said second dial, whereby said third dial may be used to indicate the angular displacement of said output shaft from a selected variable reference point.

9. Apparatus for indicating the angular position of a rotatable member relative to both a fixed and a variable reference point comprising, a rotatable output shaft, a first rotatable input shaft connected to said output shaft whereby said output shaft will rotate at the same speed as said first input shaft, a second rotatable input shaft, two-way drive means connecting said second input shaft and said output shaft whereby said output shaft will rotate at a fraction of the speed of said second input shaft when said output shaft is driven by either of said input shafts, said second input shaft mounted in coaxial relation to said first input shaft, a first dial mounted for rotation with said first input shaft, said first dial having a circumferential series of equal graduations with one of said graduations designated as zero, a second dial mounted for rotation with said second input shaft, said second dial also having a circumferential series of equal graduations with one of said graduations designated as zero, means establishing a fixed reference point for said first and second dials, said first and second dials together constituting a micrometer for indicating instantaneously the angular position of said output shaft relative to said fixed reference point, a third dial also having a circumferential series of equal graduations with one of said graduations designated as zero, said third dial disposed in coaxial relation with said second input shaft, said second dial having a recess and said third dial nesting in said recess in substantially coplanar relation with said second dial, the graduations on said third dial surrounded by the graduations on said second dial and surrounding the graduations on said first dial, and means providing a slip-friction connection between said second and third dials with the friction sufficient to cause said third dial to rotate with said second dial in the absence of a manual restraining force on said third dial but insufficient to prevent said third dial from being rotated manually relative to said second dial whereby said third dial may be used to indicate the angular displacement of said output shaft from a selected variable reference point.

10. Apparatus for indicating the angular position of a rotatable member relative to both a fixed and a variable reference point comprising, a rotatable output shaft, a first rotatable input shaft connected to said output shaft whereby said output shaft will rotate at the same speed as said first input shaft, a second rotatable input shaft, two-way drive means connecting said second input shaft and said output shaft whereby said output shaft will rotate at a fraction of the speed of said second input shaft when said output shaft is driven by either of said input shafts, said second input shaft mounted in coaxial relation to said first input shaft, a first dial mounted for rotation with said first input shaft, said first dial having a circumferential series of equal graduations representing angular degrees, a second dial mounted for rotation with said second input shaft, said second dial also having a circumferential series of equal graduations representing angular degrees, means establishing a fixed reference point for said first and second dials, said first and second dials together constituting a micrometer for indicating instantaneously the angular position of said output shaft relative to said fixed reference point, a third dial also having a circumferential series of equal graduations representing angular degrees with one of said graduations designated as zero, said third dial disposed in coaxial relation with said second input shaft, and means providing a slip-friction connection between said second and third dials with the friction sufficient to cause said third dial to rotate with said second dial in the absence of a manual restraining force on said third dial but insufficient to prevent said third dial from being rotated manually relative to said second dial, whereby said third dial may be used to indicate the angular displacement of said output shaft from a selected variable reference point, said means providing a slip-friction connection comprising two rings of relatively low surface friction disposed on opposite sides of an edge portion of said third dial, and a clamp ring removably secured to and carried by said second dial and cooperating therewith to clamp said two rings tight against said edge portion.

11. Apparatus for indicating the angular position of a rotatable member relative to both a fixed and a variable reference point comprising, a rotatable output shaft, a first rotatable input shaft connected to said output shaft whereby said output shaft will rotate at the same speed as said first input shaft, a second rotatable input shaft, a two-way drive means connecting said second input shaft and said output shaft whereby said output shaft will rotate at a fraction of the speed of said second input shaft when said output shaft is driven by either of said input shafts, said second input shaft mounted in coaxial relation to said first input shaft, a first dial mounted for rotation with said first input shaft, said first dial having a circumferential series of equal graduations with one of said graduations designated as zero, a second dial mounted for rotation with said second input shaft, said second dial also having a circumferential series of equal graduations with one of said graduations designated as zero, means establishing a fixed reference point for said first and second dials, said first and second dials together constituting a micrometer for providing a measurement of the angular position of said output shaft relative to said fixed reference point, a third dial also having a circumferential series of equal graduations with one of said graduations designated as zero, said third dial disposed in coaxial relation with said second input shaft, and means providing a slip-friction connection between said second and third dials with the friction sufficient to cause said third dial to rotate with said second dial in the absence of a manual restraining force on said third dial but insufficient to prevent said third dial from being rotated manually relative to said second dial, whereby said third dial may be used to indicate the angular displacement of said output shaft from a selected variable reference point, said slip-friction connection comprising two rings of relatively low surface friction disposed on opposite sides of an edge portion of said third dial, and a clamp ring secured to and supported by said second dial, said clamp ring comprising a series of resilient fingers cooperating with said second dial to clamp said two rings tight against said edge portion.

12. Apparatus for indicating the angular position of a rotatable member relative to both a fixed and a variable reference point comprising, a rotatable output shaft, a first rotatable input shaft connected to said output shaft whereby said output shaft will rotate at the same speed as said first input shaft, a second rotatable input shaft, two-way drive means connecting said second input shaft and said output shaft whereby said output shaft will rotate at a fraction of the speed of said second input shaft when said output shaft is driven by either of said input shafts, said second input shaft mounted in coaxial relation to said first input shaft, a first dial mounted for rotation with said first input shaft, said first dial having a circumferential series of equal graduations with one of said graduations designated as zero, a second dial mounted for rotation with said second input shaft, said second dial also having a circumferential series of equal graduations with one of said graduations designated as zero, means establishing a fixed reference point for said first and second dials, said first and second dials together constituting a micrometer for indicating instantaneously the angular position of said output shaft relative to said fixed reference point, and a third dial disposed close against said second dial in coaxial relation with said second input shaft, said third dial comprising spaced annular front and rear portions and an intermediate portion connecting said front and rear portions, said front portion having a circumferential series of graduations thereon, and means supported by said second dial providing a slip-friction connection between said second dial and said rear portion of said third dial with the friction sufficient to cause said third dial to rotate with said second dial in the absence of a manual restraining force on said third dial but insufficient to prevent said third dial from being rotated manually relative to said second dial, whereby said third dial may be used to indicate the angular displacement of said output shaft from a selected variable reference point.

13. Apparatus as defined by claim 12 wherein said second dial has a recess, and further wherein said third dial nests in said recess.

References Cited in the file of this patent
UNITED STATES PATENTS

| | | |
|---|---|---|
| 657,916 | Conant | Sept. 18, 1900 |
| 1,643,787 | Rottgradt | Sept. 27, 1927 |
| 2,177,176 | Gilmore | Oct. 24, 1939 |
| 2,539,575 | George | Jan. 30, 1951 |
| 3,013,339 | Brewer et al. | Dec. 19, 1961 |